US006992728B2

(12) United States Patent
Takagi et al.

(10) Patent No.: US 6,992,728 B2
(45) Date of Patent: Jan. 31, 2006

(54) BROADCAST RECEIVING SYSTEM WITH FUNCTION OF ON-SCREEN DISPLAYING CHANNEL INFORMATION

(75) Inventors: Toshihiro Takagi, Takatsuki (JP); Manabu Yamamoto, Mukou (JP); Yasuhiro Inui, Yao (JP); Yusuke Nishida, Ikoma (JP)

(73) Assignee: Funai Electric Co., Ltd., Daito (JP)

( * ) Notice: Subject to any disclaimer, the term of this patent is extended or adjusted under 35 U.S.C. 154(b) by 487 days.

(21) Appl. No.: 10/059,028

(22) Filed: Jan. 30, 2002

(65) Prior Publication Data

US 2002/0101541 A1 Aug. 1, 2002

(30) Foreign Application Priority Data

Jan. 31, 2001 (JP) ............................. 2001-024502

(51) Int. Cl.
*H04N 7/10* (2006.01)
*H04N 5/455* (2006.01)

(52) U.S. Cl. ........................................ 348/569; 725/49
(58) Field of Classification Search ................ 348/731, 348/732, 558, 469, 569; 725/49, 68
See application file for complete search history.

(56) References Cited

U.S. PATENT DOCUMENTS

| | | | | |
|---|---|---|---|---|
| 5,200,823 A | * | 4/1993 | Yoneda et al. ............... | 348/473 |
| 5,253,067 A | * | 10/1993 | Chaney et al. ............... | 348/570 |
| 5,438,377 A | * | 8/1995 | Chang .......................... | 348/731 |
| 5,483,684 A | * | 1/1996 | Ono et al. ................. | 455/161.2 |
| 5,528,304 A | * | 6/1996 | Cherrick et al. ............... | 725/41 |
| 6,133,910 A | * | 10/2000 | Stinebruner ................... | 725/49 |
| 6,249,320 B1 | * | 6/2001 | Schneidewend et al. .... | 348/569 |
| 6,271,893 B1 | * | 8/2001 | Kawaguchi et al. ......... | 348/725 |
| 6,321,382 B1 | * | 11/2001 | Wugofski ..................... | 725/59 |
| 6,369,861 B1 | * | 4/2002 | Lownes ....................... | 348/731 |
| 6,414,720 B1 | * | 7/2002 | Tsukidate et al. ........... | 348/469 |
| 6,473,099 B1 | * | 10/2002 | Goldman et al. ............ | 715/749 |
| 6,483,553 B1 | * | 11/2002 | Jung .......................... | 348/731 |
| 6,486,925 B1 | * | 11/2002 | Ko .............................. | 348/731 |
| 6,507,951 B1 | * | 1/2003 | Wugofski ..................... | 725/59 |
| 6,549,243 B1 | * | 4/2003 | Takashimizu et al. ....... | 348/558 |
| 6,700,624 B2 | * | 3/2004 | Yun ........................... | 348/555 |
| 6,765,628 B1 | * | 7/2004 | Van Houtum et al. ....... | 348/732 |
| 6,775,843 B1 | * | 8/2004 | McDermott ................. | 725/151 |

FOREIGN PATENT DOCUMENTS

| JP | 55-026760 | 2/1980 |
|---|---|---|
| JP | 05-236369 | 9/1993 |

* cited by examiner

Primary Examiner—Paulos M. Natnael
(74) Attorney, Agent, or Firm—Crowell & Moring LLP (57) ABSTRACT

In a broadcast receiving system for receiving the digital broadcasting, when the selection of "channel addition/deletion menu" is inputted by the user, received broadcasting signals are decoded to obtain collectively the channel information of the digital/analog broadcasting. This channel information is compared with channel information made stored in a memory to distinguish the channel having suspended from the channel having been resumed, and the distinguished information is made OSD displayed for each channel. The user operates an input device to select a desired channel, and inputs an instruction of the channel addition/deletion with an addition button or a deletion button to update the data stored in the memory. In this way, the display of the channel information of the digital/analog broadcasting transmitted from the same or the same-system broadcasting station is made displayed continuously and mixedly, thereby making it possible for the user to understand visually a transition in channel configuration.

13 Claims, 5 Drawing Sheets

BROADCAST RECEIVING SYSTEM WITH FUNCTION OF ON-SCREEN DISPLAYING CHANNEL INFORMATION

BACKGROUND OF THE INVENTION

The present invention relates to a broadcast receiving system with a function of on-screen displaying channel information of receivable digital/analog broadcasting.

Conventionally, broadcast receiving systems such as television receivers include those OSD displaying a channel number to improve the convenience in the use for the user. By way of example, there is a display device which makes easy the check of a received channel by changing the modification of a channel number decided to be being received, with all receivable channel numbers displayed in a list on the display of CRT (for example, see Japanese Unexamined Patent Publication No. 5-236369). The decision of the receiving state in the display device is made whether an AFT (Automatic Frequency Tuning) signal outputted from a tuner is present or not within a predetermined frequency range. As an example of another device, there is a channel selection device which shifts sequentially all channels, detects the presence of broadcasting signals of each channel by the presence of a VIF (Video Intermediate Frequency) signal or a vertical synchronizing signal detected by a broadcasting detection circuit, and displays a list in which the broadcasting signals are present in which channel, thereby making easy the operation of the channel selection during channel selecting (for example, see Japanese Unexamined Patent Publication No. 55-26760). In also this selection device, the sequential channel shift is executed by controlling the frequency received by the tuner.

Meanwhile, in recent years, in addition to conventional analog broadcasting, there have been transmitted and rapidly popularized the digital broadcasting represented by the BS (Broadcasting Satellite) digital broadcasting and the CS (Communication Satellite) digital broadcasting, by which high-quality image and multi-channel are made possible. The digital broadcasting, for example, in the broadcasting according to the digital broadcasting standard ATSC (Advanced Television System Committee) of North America, is transmitted by a physical channel different from the analog broadcasting. In these digital broadcastings, there are many digital broadcastings transmitted from the same broadcasting station as that for the analog broadcasting or a broadcasting station with the same system as for the analog broadcasting. In this case, in order to improve the convenience in the use for the user who is accustomed to the channel number of the conventional analog broadcasting, the digital broadcasting has been operated such that channel selection and display can be performed by a virtual channel to which the same channel number as that for conventional analog broadcasting has been allocated.

In the digital broadcasting, there have been allocated to each channel a carrier wave having a predetermined frequency band different from that for the analog broadcasting. The channel is called a main channel, and one main channel includes a sub-channel to transmit one or a plurality of contents. The configuration of the sub-channel varies according to the broadcasting time band, and by way of example, FIG. 5 shows the configuration of the sub-channel in a time band (8:00 p.m. to 12:00 p.m.) of the main channel "4."

Figure 5:
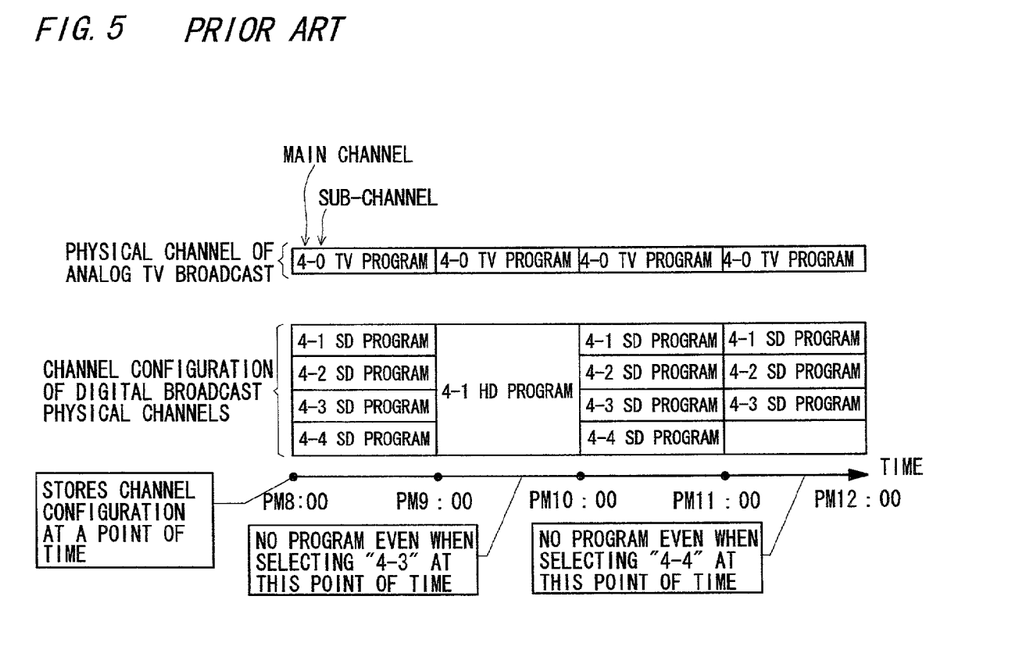
FIG. 5 is a view showing a channel configuration of the digital broadcasting received by the system.

According to FIG. 5, at 8:00 p.m. to 9:00 p.m., the sub-channels "0" to "4" are broadcasted; at 9:00 p.m. to 10:00 p.m., the sub-channels "0" and "1"; at 10:00 p.m. to 11:00 p.m., the sub-channels "0" to "4"; and at 11:00 p.m. to 12:00 p.m., the sub-channels "0" to "3". Here, the channels with the sub-channel "0" (the physical channels "4-0") are of an analog broadcasting according to NTSC (National Television Systems Committee) standard, while the channels with the sub-channels "1" to "4" (the virtual channels "4-1" to "4-4") are of a digital broadcasting. The television programs broadcasted from the channel "4-0" are those of the conventional analog broadcasting; the SD (Standard Definition) programs broadcasted from the channels "4-1" to "4-4" are those with standard image quality of the digital broadcasting; the HD (High Definition) programs broadcasted from the channel "4-1" are those with high image quality of the digital broadcasting.

As described above, in conventional systems, the channel information of digital/analog broadcasting is displayed by executing the decision of a receiving state for each frequency band received by the tuner, so that the sequence of the channel information-screened depends on the frequency band transmitted. Therefore, even for a digital broadcasting to which the same virtual channel number as an analog broadcasting is given, the digital broadcasting has a frequency band different from the above-mentioned analog broadcasting, and thus is not displayed continuously or mixedly on one display. Hence, it is difficult for the user to understand same receivable or same-system receivable channels.

The channel structure in the digital broadcasting frequently fluctuates depending on the time band, so that only displaying simply a receivable channel makes it unclear that the broadcasting of which channel has suspended, or the broadcasting of which channel has been resumed, thereby making poor the convenience in use.

Still further, the digital broadcasting is transmitted in multi-channels, so that when all receivable channels are displayed as with conventional systems, all channels including even a channel the user does not want to see and hear will be displayed. Hence, a complex operation is imposed for the user.

SUMMARY OF THE INVENTION

The present invention is made to solve the above-mentioned problems and it is an object of the invention to provide a broadcast receiving system which displays channel information of the digital/analog broadcasting transmitted from the same or the same-system broadcasting stations in a mixed state on OSD display, and makes it possible to understand easily and visually a transition of the channel configuration in the digital broadcasting, and further displays only the channel information the user wants to see and hear on a display OSD displayed, and stores the channel information in a memory, thereby improving the convenience in use at the selecting operation by the user.

In order to achieve the above-mentioned object, according to one aspect of the present invention, a broadcast receiving system with a function of on-screen displaying channel information by a display device comprises, an input device for inputting an operation instruction to the system, a receiver for receiving coded digital/analog broadcasting signals transmitted from a broadcasting station, a digital/analog decoder for decoding the digital/analog broadcasting signals received by the receiver and outputting them to an image-displaying display device connected to the system, a memory for storing the channel information included in the broadcasting signals decoded by the digital decoder, an on-screen display (hereinafter described as OSD) output circuit for making the display device to display a predetermined OSD, and a control unit for controlling the system, wherein the system receives the digital broadcasting signals and the analog broadcasting signals transmitted from the same or the same-system broadcasting stations with respective channels different from each other, and the digital broadcasting signals include one or a plurality of sub-channels to transmit contents for each channel, and given to these sub-channels are virtual channels consisting of the same channel number as for the analog broadcasting and of the sub-channel number, characterized in that; the control unit controls the system such that the receiver receives the broadcasting signals of a receivable channel in response to an instruction of received channel information addition/deletion or an instruction of channel change inputted by the input device, the digital decoder decodes these broadcasting signals for analyzing the channel information from the decoded signals, the display device OSD displays a list of the channel information of the analog broadcasting and of the virtual channel of the digital broadcasting with the digital/analog channel information mixed, and the channel information analyzed from the decoded signals is compared with the channel information stored in the memory so that the system distinguishes a channel having become unable to receive from a channel having become newly receivable, and OSD displays the distinguished channel information, and said control unit has a data deleting section for deleting the stored data of the memory in response to a user operation instruction specifying the deletion of the sub-channel having become unable to receive among the list OSD displayed in the display device, and a data adding section for adding the stored data of the memory in response to the user operation instruction specifying the addition of the sub-channel having become newly receivable.

According to the feature aspect of the present invention thus constructed, analog broadcasting signals are transmitted with a conventional channel, while digital broadcasting signals are transmitted with a channel different from for the analog broadcasting signals. Therefore, the digital/analog broadcasting signals, even when transmitted from a same or a same-system broadcasting station, are transmitted with respective channels different from each other. The digital broadcasting signals include sub-channels transmitting one or a plurality of contents for each channel. Allocated to these sub-channels are virtual channels including the same number as the channel number of the analog broadcasting, whereby the user accustomed to the analog broadcasting can select channels without incongruity.

Then, when the user inputs an instruction of an addition/deletion of received channel information or an instruction of channel change, a control unit makes a receiver to receive coded broadcasting signals, makes a digital decoder to decode these broadcasting signals, and analyzes the decoded signals, thereby obtaining the channel information. The channel information obtained here includes the virtual channel number of the digital broadcasting and the channel information of the analog broadcasting. Therefore, the digital/analog channel information transmitted from a same or a same-system broadcasting station can be collectively obtained. Thus, the control unit makes a memory to collectively store these channel information, and can make a display device to OSD display the list of the channel information with the digital/analog channel information mixed.

At this time, the control unit compares the obtained channel information with the channel information read from the memory, distinguishes a channel having become unable to receive from a channel having become newly receivable, OSD displays the effect for each channel, thereby designating the changed points of the channel information. The OSD display includes, for example, a display in which the broadcast-suspended channel having become unable to receive is displayed by being overlapped with double line, while the broadcast-resumed channel having become newly receivable is displayed by being surrounded with a frame.

In this way, the changed points of the channel information are displayed, so that the user, using a data deleting function or a data adding function, can delete the stored data or make the added data store. This causes the channel information OSD displayed on the display device to be sequentially updated to newest data.

According to the feature aspect of the present invention, the digital/analog broadcasting signals, even when transmitted from a same or a same-system broadcasting station, are transmitted with respective channels different from each other, the digital broadcasting signals include sub-channels transmitting one or a plurality of contents for each channel, and allocated to these sub-channels are virtual channels including the same number as the channel number of the analog broadcasting. Therefore, in response to an instruction of the channel information or an instruction of the channel change from the user, the digital/analog channel information transmitted from a same or a same-system broadcasting station are collectively obtained, stored in the memory, and OSD displayed with the digital/analog channel information mixed.

DETAILED DESCRIPTION OF THE PREFERRED EMBODIMENT OF THE PRESENT INVENTION

Figure 1:
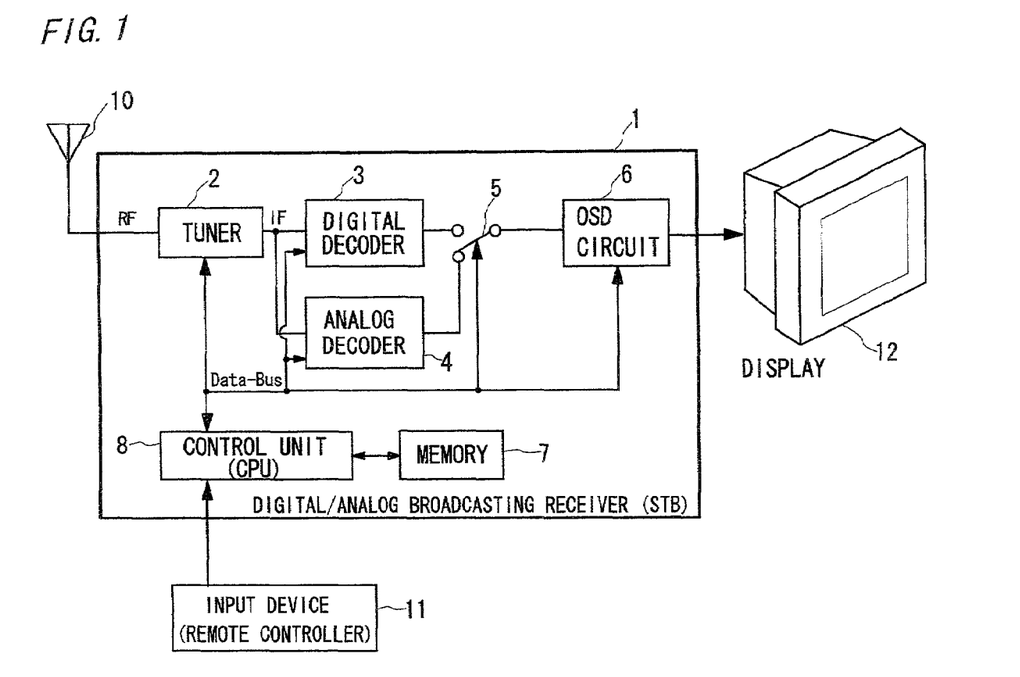
FIG. 1 is a block diagram of a broadcast receiving system according to one embodiment of the present invention.

A digital/analog broadcast receiving system in connection with on embodiment embodying the present invention will be explained with reference to the drawings hereinafter. FIG. 1 shows a block diagram of a digital/analog broadcast receiving system (hereinafter called the present system). The present system 1 is a set top box (STB) which receives coded digital/analog broadcasting signals with high-frequency (RF) transmitted from a television broadcasting station through an antenna 10, and in response to the operation input of the channel information display from the user using an input device 11 such as a body button or a remote controller 30 shown in FIG. 2 later described, displays in a list the channel information receivable to a display device 12 for on-screen displaying the image signals included in the broadcasting signals.

The present system 1 includes a tuner 2 (receiver) for receiving digital/analog broadcasting signals present in a frequency band corresponding to a desired channel, a digital decoder 3 and an analog decoder 4 for decoding the digital/analog broadcasting signals received by the tuner 2, a switch 5 for switching the broadcasting signals decoded by the digital decoder 3 or the analog decoder 4, an on-screen display (hereinafter described as OSD) circuit 6 for making the display device 12 to display a predetermined OSD, a memory 7 for storing the transmitted frequency of each main channel or the channel configuration information in the digital broadcasting, and a control unit 8 consisting of CPU for controlling each members of the present system.

The tuner 2 receives the digital/analog broadcasting signals received by the antenna 10, performs the channel selection operation in response to an instruction inputted into the control unit 8 from the input device 11, receives the digital/analog broadcasting signals present in a frequency band corresponding to a channel inputted, and modulates them to intermediate frequency (IF) to output to the digital decoder 3 and the analog decoder 4. The digital decoder 3 and the analog decoder 4 decode the broadcasting signals received by the tuner 2. The channel configuration in the digital broadcasting is such that a frequency band different for each main channel is given, so that for a sub-channel in the same main channel, the broadcasting signals with the same frequency are transmitted. However, even for the digital broadcasting having a virtual channel with the same number prefix as that for the analog broadcasting, the physical channels are different from each other, so that the broadcasting signals are transmitted by a carrier wave of a different frequency band. When a channel selected by the user is a digital broadcasting channel (when the sub-channel is not "0"), the decoding processing is executed by the digital decoder 3. When a channel selected by the user is an analog broadcasting channel (when the sub-channel is "0"), the decoding processing is executed by the analog decoder 4.

The switch 5 receives an instruction from the control unit 8, and outputs the broadcasting signals decoded by either the digital decoder 3 or the analog decoder 4 to the OSD circuit 6. The OSD circuit 6 outputs the broadcasting signals to the display device 12 according to the instruction from the control unit 8, and outputs OSD display signals to display a predetermined list in respect to the receivable channel information. The memory 7 stores the information on the frequency band of each channel or the channel configuration information, and stores the information on the OSD display at the time of the factory-shipped present system.

The control unit 8 receives an input operation by the user using the input device 11 to execute various controls through the data bus, makes the memory 7 to store the information on the frequency band of each channel or the channel information received, and as required, refers to these information at the time of channel selecting and the like.

In particular, the control unit 8, when an image is displayed at the time of closing of the power switch of the present system 1, or when a channel is changed, makes the tuner 2 to receive the broadcasting signals of an applicable channel, analyzes VCT (Virtual Channel Table) as the channel information obtained by decoding the broadcasting signals with the digital decoder 3, and obtains status signals including therein. The status signals usually include all digital/analog sub-channel information in a virtual main channel. Therefore, the control unit 8, by analyzing the above-mentioned VCT, can obtain a virtual channel number consisting of the same number (main channel) and sub-channel number as a conventional channel number which has been given to a same or a same-system broadcasting station transmitting the above-mentioned digital/analog broadcasting. That is, the channel information of the digital/analog broadcasting transmitted from a same or a same-system broadcasting station can be collectively obtained. The control unit 8 makes the memory 7 to store the obtained status signals, thereby making the memory 7 to store the channel information.

Also, the control unit 8 makes the display device 12 to display an addition button (data addition means) 51 and a deletion button (data deletion means) 52 as shown in FIG. 3 later described, and in response to an instruction from the above-mentioned addition button 51 and deletion button 52 by the user operation, adds and deletes the channel information in the memory 7.

Further, the control unit 8 decides whether a broadcasting signal is present based on the status signal, and makes the display device 12 to image output a predetermined OSD display or an image program of the broadcasting selected. The display device 12 may employ the display display of a television receiver, and may be a flat panel display device such as LCD (Liquid Crystal Display) and PDP (Plasma Display Panel), as well as CRT. The present system 1 includes a D/A converting circuit for converting digital signals to analog ones, though not shown, and the signals for the above-mentioned OSD display and image display are converted to analog signals by the D/A converting circuit, and then outputted to the display device 12. The above-mentioned D/A converting circuit may be configured to be contained in the display device 12. The digital signals, when displayed on the above-mentioned flat panel display, are outputted, as are kept unconverted, not through the D/A converting circuit.

Figure 2:
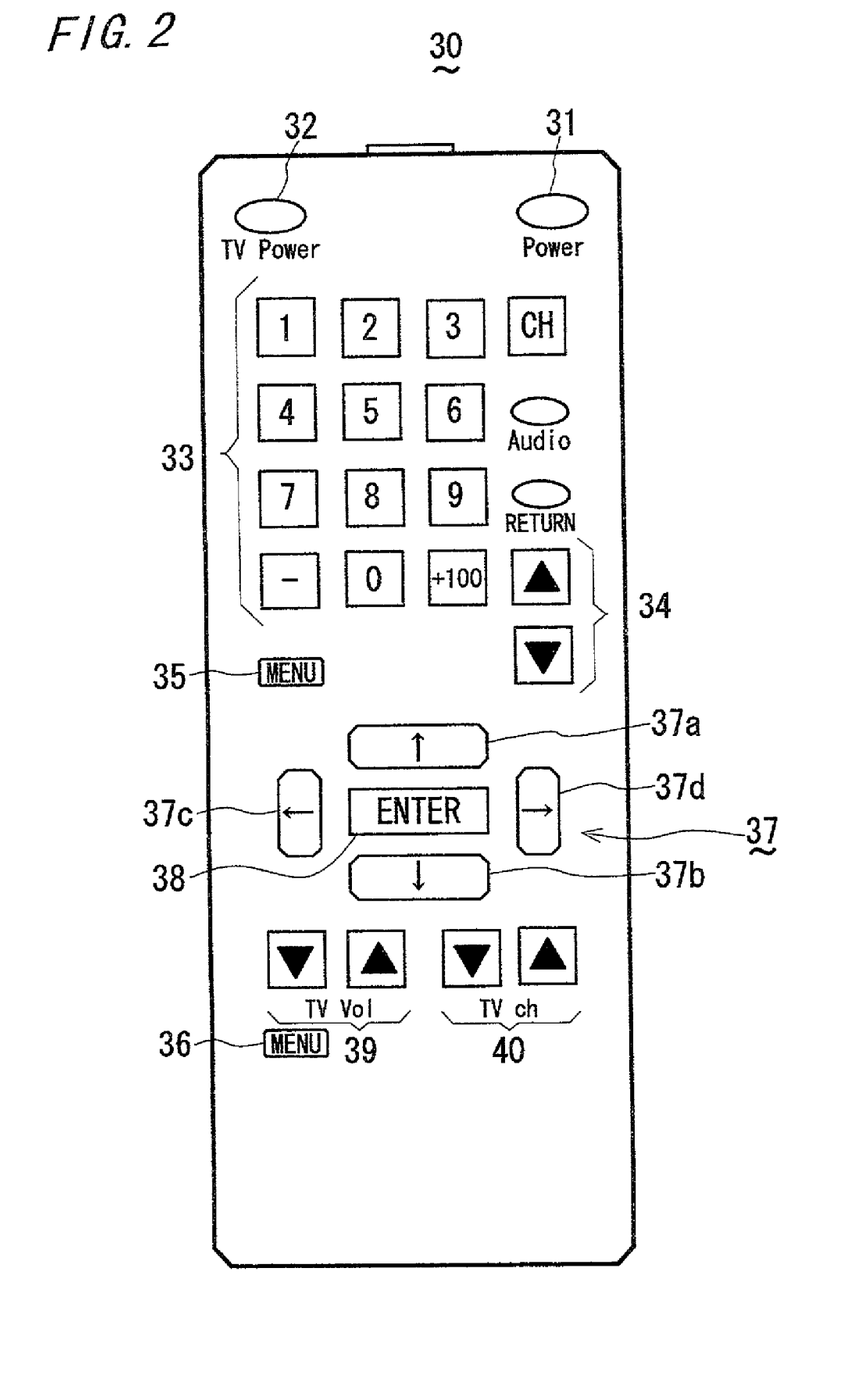
FIG. 2 is a plan view of a remote controller used for the system.

The input device 11 is a device for inputting an operation instruction by the user into the control unit 8. An example of the input device 11 is a body button provided in front of the present system 1 or a remote controller 30 as shown in FIG. 2. The remote controller 30 is configured such that it can indicate the operation of the present system 1 and the television receiver by the use of infrared rays and the like. That is, the controller includes power keys 31, 32 for turning on/off the power source of the present system 1 and the television receiver, ten keys 33 for inputting channel number of the present system 1, channel up/down keys 34 used for changing the channel, menu keys 35, 36 for calling the menu display of the present system 1 and the television receiver, direction keys 37 (37a through 37d) for shifting the cursor in a desired direction, an enter (ENTER) key 38 for defining an input, volume up/down keys 39 for adjusting the voice volume of the television receiver, and channel up/down keys 40 used for changing the channels of the television receiver.

Figure 3A:
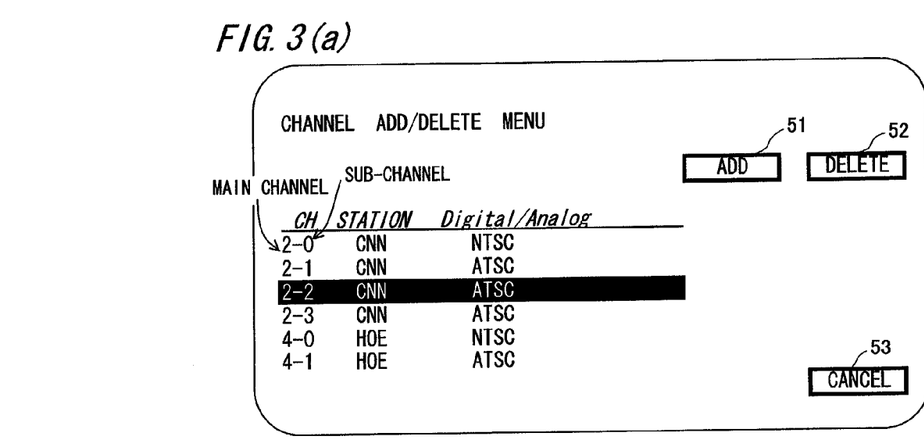
FIG. 3 is a view showing an OSD display display of the channel information according to the system.

Then, an example of the display of the channel information which is made displayed by the display device 12 will be shown in FIG. 3(a). The channel information is OSD displayed, as shown in FIG. 3(a), in such a manner that the user operates the menu key 35 on the remote controller 30 to give an instruction to the control unit 8 so as to make the display device 12 to display a menu list, and selects "channel addition/deletion menu" among the menus. In the present system 1, as described above, the control unit 8 can obtain collectively the channel information of the analog broadcasting and the channel information of the digital broadcasting to which a virtual channel with the same channel number as that for the analog broadcasting has been allocated, so that the control unit 8 can make the display device 12 to OSD display continuously and mixedly the channel information of the analog broadcasting (channel "2-0" and channel "4-0") and the channel information of the digital broadcasting (channels "2-1," "2-2," "2-3" and channel "4-1") to which a virtual channel with the same channel number as that for the analog broadcasting has been allocated.

In the "channel addition/deletion menu," an addition button 51 and a deletion button 52 of the channel information are displayed, so that in response to an instruction of the operation from the user using the remote controller 30, the addition/deletion of the channel information stored in the memory 7 can be performed. At first, the user operates the up/down direction keys 37a, 37b to select the channel information he wants to add/delete. The selected channel is displayed inversely, that is, the channel "2-2" is selected in FIG. 3. Then, the user operates the right/left direction keys 37c, 37d to select the addition button 51 and the deletion button 52, and defines with the enter key 38, whereby the channel "2-2" is added/deleted to/from the memory 7.

Figure 3B:
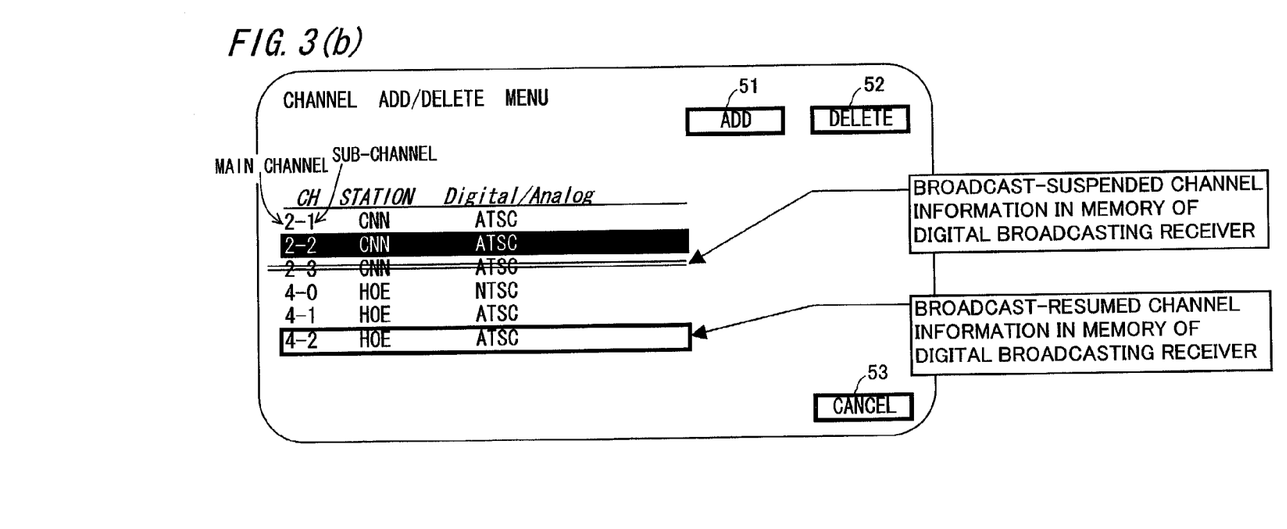

Also, another example of the list of the channel information which is made displayed by the display device 12 will be shown in FIG. 3(b). The list is such that by comparing the channel information obtained when the list of the channel information is displayed with the channel information stored in the memory 7, the channel having broadcast-suspended at that point (having become unable to receive) is distinguished from the channel having been broadcast-resumed (having become newly receivable), whereby the OSD display of the effect is added to the list shown in FIG. 3(a). The channel configuration in the digital broadcasting frequently transits depending on the time band as shown in FIG. 5, so that the channel information is complex and hard to understand. However, in the list shown in FIG. 3(b), the channel (channel "2-3") having broadcast-suspended by comparing with the channel information in the memory 7 is OSD displayed by being overlapped with double line, while the channel (channel "4-2") having been broadcast-resumed is OSD displayed by being surrounded with frame, so that the changed points of the channel information can be visually understood, and thus the addition/deletion of the channel information stored in the memory 7 can be easily performed by the operation of the direction keys 37 of the remote controller 30. Further, the user, when wanting to terminate the "channel addition/deletion menu," may operate the direction keys 37 to select a cancel button 53, and define it with the enter key 38.

Figure 4:
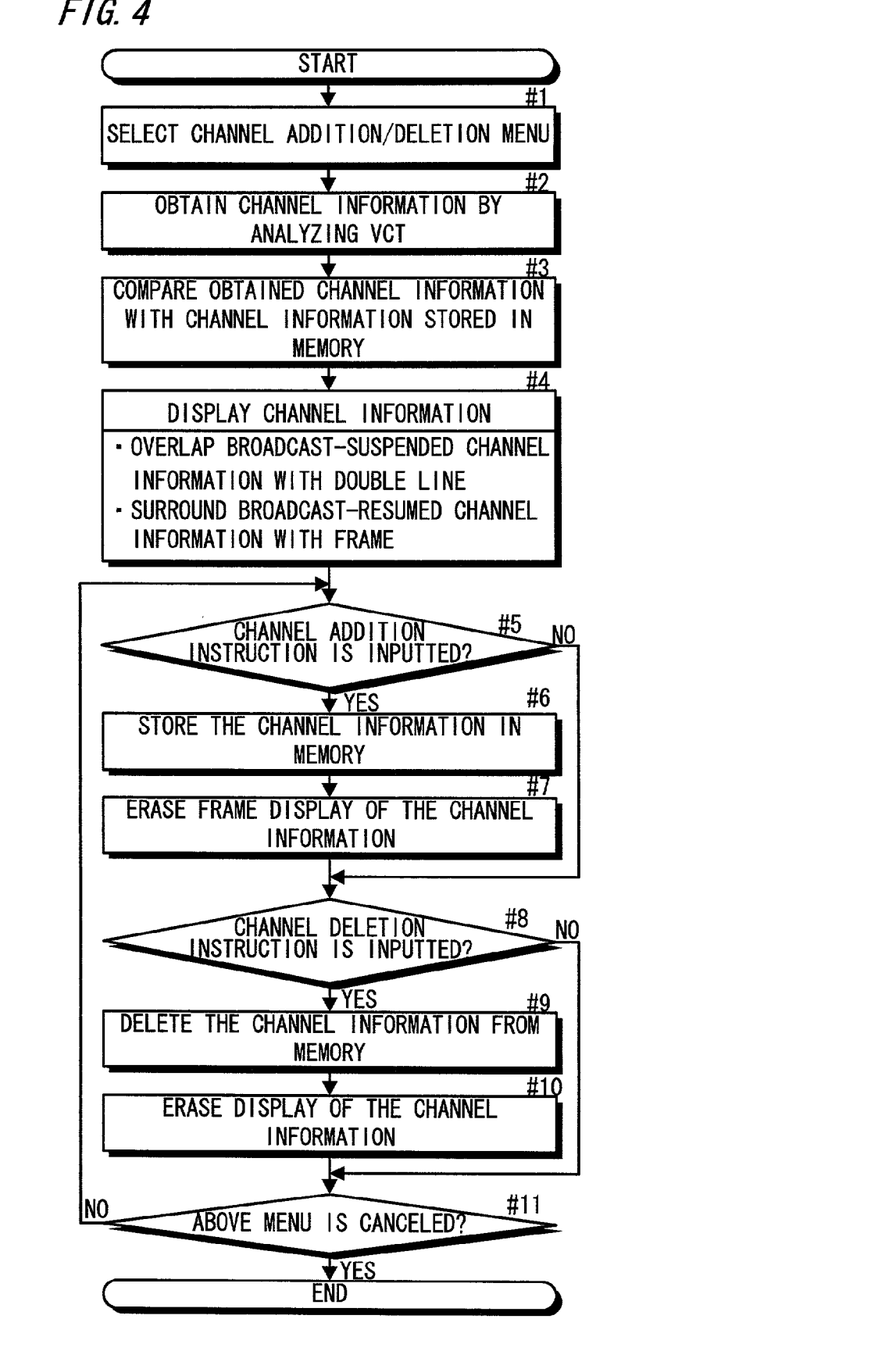
FIG. 4 is a flowchart of the operation by the control unit of the system.

With reference to FIG. 4, the operation by the control unit 8 of the present system 1 when an instruction of the channel information list display is inputted from the user will be explained hereinafter. At first, when the selection of "channel addition/deletion menu" is inputted from the user (#1), the control unit 8 makes the digital decoder 3 to decode the broadcasting signals received by the tuner 2, and analyzes VCT obtained by the decode, thereby obtaining the channel information of the digital/analog broadcasting (#2). Then, the control unit 8 compares the channel information obtained at #2 with the channel information stored in the memory 7 to decide the channel having become unable to receive and the channel having become newly receivable (#3). Then, the channel information is displayed on the display device 12 (#4). More specifically, as shown in FIG. 3(b), with the distinction at #3, the channel information whose broadcasting is decided to have suspended (disappeared) is overlapped with double line, while the channel information whose broadcasting is decided to have resumed (become newly receivable) is surrounded with frame.

Thereafter, when a channel addition is instructed from the user (YES at #5), the control unit 8 makes the memory 7 to store an applicable channel information (#6), and erases the frame display of the channel information (#7). Further, when a channel deletion is instructed (YES at #8), the control unit 8 deletes the channel information from the memory 7 (#9) and erases the display of the channel information (#10).

When the channel addition is not instructed (NO at #5), and the channel deletion is not instructed (NO at #8), the operation proceeds to #8 and #11, respectively. The procedure of #5 through #11 is repeated until the above menu is canceled (YES at #11). In this way, the channel addition/deletion can be easily performed.

The present invention is not limited to the configuration of the above-mentioned embodiments, and various modifications can be made, and for example, the channel information made OSD displayed by the display device 12 is not limited to the list of receivable channels, but may be OSD displayed for one or a plurality of main channels specified by the user. OSD displaying, as the sub-channel of the same main channel, both the channel number of the analog broadcasting and the digital broadcasting which has the same virtual channel as the analog broadcasting, even when it is different in physical channel from the channel number of the analog broadcasting allows the user to understand easily the channel configuration.

The channel information may be displayed when an instruction of "channel change" is inputted from the user. At this time, the control unit 8 is sufficient to make the display device to OSD display the main channel as with the above. Further, the present system 1 may be configured so as to be contained in the body of television receiver or a video recorder.

According to the present invention, when an instruction of received channel addition/deletion is inputted from the user, the sub-channel information of the digital/analog broadcasting transmitted from a same or a same-system broadcasting station is displayed continuously and mixedly, so that when selecting a channel utilized by the user, channels to be added/deleted become easy to understand. Also, at the time of channel change, a channel to be changed is easy to understand. When displaying the above-mentioned channel information, for the sub-channel having become unable to receive and the sub-channel having become receivable, the channel information is OSD displayed, that is, the changed points of the channel information are OSD displayed, so that the user can visually understand a transition in channel configuration, for example, that the broadcasting of a sub-channel has suspended, and thus can easily perform the channel addition/deletion. Further, in response to an instruction from the user, the addition/deletion of a channel to be stored in the memory can be easily performed, so that the user, by deleting the stored data of a sub-channel he does not want to see and hear, can make the display device to OSD display only the sub-channel information utilized by the user, and the memory to store it, thereby improving the convenience in use.

When an instruction of the channel information display or an instruction of the channel change is inputted from the user, the channel information of the digital/analog broadcasting transmitted from the same or the same-system broadcasting station is displayed continuously and mixedly, so that a receivable channel becomes easy to understand. When displaying the channel information, for the sub-channel having become unable to receive and the sub-channel having become receivable, the effect is OSD displayed, so that the user can understand visually a transition in channel configuration. Further, in response to an instruction from the user, the addition/deletion of a channel to be stored in the memory can be easily performed, so that the user, by deleting the stored data of a sub-channel he does not want to see and hear, can make the display device to OSD display only the sub-channel information utilized by the user in the above-mentioned list, and the memory to store it, thereby improving the convenience in use.

What is claimed is:

1. A broadcast receiving system with a function of on-screen displaying channel information by a display device comprising:
   an input device for inputting an operation instruction to the system;
   a receiver for receiving coded digital/analog broadcasting signals transmitted from a broadcasting station;
   a digital/analog decoder for decoding the digital/analog broadcasting signals received by the receiver and outputting them to an image-displaying display device connected to the system;
   a memory for storing the channel information included in the broadcasting signals decoded by the digital decoder;
   an on-screen display output circuit for making the display device to display a predetermined on-screen display; and
   a control unit for controlling the system, wherein the system receives the digital broadcasting signals and the analog broadcasting signals transmitted from the broadcasting stations with respective channels different from each other, and the digital broadcasting signals include one or a plurality of sub-channels to transmit contents for each channel, and given to these sub-channels are virtual channels consisting of the same channel number as for the analog broadcasting and of the sub-channel number;
   characterized in that, the control unit controls the system such that the receiver receives the broadcasting signals of a receivable channel in response to an instruction of received channel information addition/deletion or an instruction of channel change inputted by the input device, the digital decoder decodes these broadcasting signals for analyzing the channel information from the decoded signals, the display device on-screen display displays a list of the channel information of the analog broadcasting and of the virtual channel of the digital broadcasting with the digital/analog channel information mixed, and the channel information analyzed from the decoded signals is compared with the channel information stored in the memory so that the system distinguishes a channel having become newly receivable, and the on-screen display displays the distinguished channel information; and said control unit has:
   a data deleting section for deleting the stored data of the memory in response to a user operation instruction specifying the deletion of the sub-channel having become unable to receive among the list the on-screen display displayed in the display device; and
   a data adding section for adding the stored data of the memory in response to a user operation instruction specifying the addition of the sub-channel having become newly receivable.

2. A broadcast receiving system with a function of on-screen displaying channel information by a display device comprising:
   an input device for inputting an operation instruction to the system;
   a receiver for receiving coded digital broadcasting signals transmitted from a broadcasting station;
   a digital decoder for decoding the digital broadcasting signals received by the receiver and outputting them to an image-displaying display device connected to the system;
   a memory for storing the channel information included in the broadcasting signals decoded by the digital decoder;
   an on-screen display output circuit for making the display device to display a predetermined on-screen display; and
   a control unit for controlling the system, wherein the system receives the digital broadcasting signals and the analog broadcasting signals transmitted from the broadcasting stations with respective channels different from each other, and the digital broadcasting signals include one or a plurality of sub-channels to transmit contents for each channel, and given to these sub-channels are virtual channels consisting of the same channel number as for the analog broadcasting and of the sub-channel number;
   characterized in that, the control unit controls the system such that the receiver receives the broadcasting signals of a receivable channel in response to an instruction of channel information display or an instruction of channel change inputted by the input device, the digital decoder decodes these broadcasting signals for analyzing the channel information from the decoded signals, the display device's on-screen display displays a list of the channel information of the analog broadcasting and of the virtual channel of the digital broadcasting including sub-channels with the digital/analog channel information mixed.

3. The broadcast receiving system with a function of on-screen displaying the channel information according to claim 2, wherein the control unit compares the channel information analyzed from the decoded signals with the channel information stored in the memory, distinguishes a channel having become unable to receive from a channel having become newly receivable, and displays the distinguished channel information when making the display device to display the channel information.

4. A broadcast receiving system with a function of on-screen displaying channel information by a display device comprising:
   an input device for inputting an operation instruction to the system;
   a receiver for receiving coded digital broadcasting signals transmitted from a broadcasting station;
   a digital decoder for decoding the digital broadcasting signals received by the receiver and outputting them to an image-displaying display device connected to the system;
   a memory for storing the channel information included in the broadcasting signals decoded by the digital decoder;
   an on-screen display output circuit for making the display device to display a predetermined on-screen display; and
   a control unit for controlling the system, wherein the system receives the digital broadcasting signals and the analog broadcasting signals transmitted from the broadcasting stations with respective channels different from each other, and the digital broadcasting signals include one or a plurality of sub-channels to transmit contents for each channel, and given to these sub-channels are virtual channels consisting of the same channel number as for the analog broadcasting and of the sub-channel number;

characterized in that, the control unit controls the system such that the receiver receives the broadcasting signals of a receivable channel in response to an instruction of channel information display or an instruction of channel change inputted by the input device, the digital decoder decodes these broadcasting signals for analyzing the channel information from the decoded signals, the display device's on-screen display displays a list of the channel information of the analog broadcasting and of the virtual channel of the digital broadcasting with the digital/analog channel information mixed; and wherein the control unit includes a data deleting section for deleting the stored data of the memory in response to a user operation instruction specifying the deletion among the list in the display device, and a data adding section for adding the stored data of the memory in response to the user operation instruction specifying the addition of the sub-channel having become newly receivable.

5. The broadcast receiving system of claim 1, wherein the broadcast receiving system is a set-top box.

6. The broadcast receiving system of claim 2, wherein the broadcast receiving system is a set-top box.

7. The broadcast receiving system of claim 1, wherein the input device is a remote control.

8. The broadcast receiving system of claim 2, wherein the input device is a remote control.

9. The broadcast receiving system of claim 1, wherein the display device is a television receiver.

10. The broadcast receiving system of claim 2, wherein the display device is a television receiver.

11. The broadcast receiving system of claim 7, wherein the remote control includes:

a power input for turning on/off said broadcast receiving system;

a plurality of keys for inputting the channel number;

a menu key for accessing a menu display;

a plurality of direction keys for shifting a cursor in a desired direction;

an ENTER key for defining an input; and a volume input for adjusting a volume of the display device.

12. The broadcast receiving system of claim 1, wherein the channel information is displayed via a predetermined electronic program guide; which includes:

at least one line of text, naming one or more newly receivable channels wherein said at least one line of text has a first demarcation; and at least one line of text, naming one or more newly unreceivable channels wherein said at least one line of text has a second demarcation.

13. A broadcast receiving system with a function of on-screen displaying channel information by a display device comprising:

an input device for inputting an operation instruction to the system;

a receiver for receiving coded digital broadcasting signals transmitted from a broadcasting station;

a digital decoder for decoding the digital broadcasting signals received by the receiver and outputting them to an image-displaying display device connected to the system;

a memory for storing the channel information included in the broadcasting signals decoded by the digital decoder;

an on-screen display output circuit for making the display device to display a predetermined on-screen display; and a control unit for controlling the system, wherein the system receives the digital broadcasting signals and the analog broadcasting signals transmitted from the broadcasting stations with respective channels different from each other, and the digital broadcasting signals include one or a plurality of sub-channels to transmit contents for each channel, and given to these sub-channels are virtual channels consisting of the same channel number as for the analog broadcasting and of the sub-channel number;

characterized in that, the control unit controls the system such that the receiver receives the broadcasting signals of a receivable channel in response to an instruction of channel information display or an instruction of channel change inputted by the input device, the digital decoder decodes these broadcasting signals for analyzing the channel information from the decoded signals, the display device's on-screen display displays a list of the channel information of the analog broadcasting and of the virtual channel of the digital broadcasting with the digital/analog channel information mixed; and wherein the channel information is displayed via a predetermined electronic program guide; which includes;

at least one line of text, naming one or more newly receivable channels wherein said at least one line of text has a first demarcation; and at least one line of text, naming one or more newly unreceivable channels wherein said at least one line of text has a second demarcation.

* * * * *